United States Patent [19]

Lodge et al.

[11] Patent Number: 4,600,642

[45] Date of Patent: Jul. 15, 1986

[54] RADAR WAVE DIPOLE OF COPPER COATED CARBON FIBERS

[75] Inventors: Kevin J. Lodge, Synsham, Nr Brackley; Jack Brettle, Towcester, both of England

[73] Assignee: Plessey Overseas Limited, Ilford, England

[21] Appl. No.: 670,136

[22] Filed: Nov. 13, 1984

Related U.S. Application Data

[63] Continuation of Ser. No. 450,672, Dec. 17, 1982, abandoned.

[30] Foreign Application Priority Data

Dec. 19, 1981 [GB] United Kingdom ................. 8138348

[51] Int. Cl.⁴ ................................................ B32B 9/00

[52] U.S. Cl. ................................ 428/367; 343/18 R; 343/18 E; 428/378; 428/389; 428/401

[58] Field of Search ............... 428/389, 367, 378, 375, 428/213, 215, 216, 401; 343/18 R, 18 E

[56] References Cited

U.S. PATENT DOCUMENTS

| | | | |
|---|---|---|---|
| 4,132,828 | 1/1979 | Nakamuro et al. | 428/389 |
| 4,359,737 | 12/1982 | Bond | 343/18 E |
| 4,481,249 | 11/1984 | Ebneth et al. | 428/367 |

FOREIGN PATENT DOCUMENTS

| | | | |
|---|---|---|---|
| 25056 | 4/1973 | Japan | 428/389 |
| 25065 | 5/1973 | Japan | 428/389 |
| 1215002 | 3/1970 | United Kingdom | 428/389 |

*Primary Examiner*—Marion C. McCamish

*Attorney, Agent, or Firm*—Fleit, Jacobson, Cohn & Price

[57] ABSTRACT

Small lengths of conductors, cut to the appropriate size are used as radar "chaff" or passive reflectors to give spurious returns on an enemy radar and thereby act as an electronic countermeasure. Currently used chaff includes chopped aluminum foil, aluminum coated glass fibres and silver coated nylon monofilaments. Current radars operate in the $10^{10}$ Hz region and current chaff dipoles are of centimetric size, but future radar systems are likely to operate at higher frequencies requiring shorter dipoles lengths to achieve an increased packing density the dipoles also need to be thinner. Carbon fibres have advantages over existing chaff materials as they are fine, light and much stiffer than existing chaff materials. The electrical resistance is about 1000× higher than that of aluminum however and this invention therefore proposes the use of carbon fibres coated with a much more conductive coating. Typical coating materials can be copper, silver aluminium applied by a number of different methods.

5 Claims, No Drawings

RADAR WAVE DIPOLE OF COPPER COATED CARBON FIBERS

This application is a continuation of application Ser. No. 450,672, filed Dec. 17, 1982, now abandoned.

This invention relates to electrically conductive material and more particularly but not exclusively to electrically conductive material which can be used in small sizes as radar "chaff" dipoles or passive reflectors to give spurious returns on radar equipment and thereby act as an electronic countermeasure.

The use of such chaff dipoles is well known and currently used chaff dipoles include rectangular aluminium foil of, for example, 100 $\mu m \times 25$ $\mu m$ and 50 $\mu m \times 25$ $\mu m$ sections, aluminium up to 30 $\mu m$ thick coated on to 20 $\mu m$ diameter glass fibres and thin silver deposits of around 0.1 $\mu m$ coated on to nylon filaments of around 100 $\mu m$ diameter.

Many current radars operate in the $10^{10}$ Hz region with chaff dipoles being of centi-metric size, but future radar systems are likely to operate at higher frequencies requiring smaller and smaller dipole lengths. As the frequency rises, the number of dipoles required to give a specified effective reflection area increases by the power of two if a disc shaped cloud of dipoles is considered, and by the power of three if a spherical cloud is considered. The reduction in length will of course allow an increase in the number of dipoles but only to the power of one. There is a demand therefore for chaff of increased packing density but there is a limit to the increase in packing density which could be achieved using current methods.

It is an object of the present invention therefore to provide an electrically conductive material which inter alia will enable a higher packing density of chaff dipoles to be achieved.

According to the present invention an electrically conductive material comprises carbon fibre having a coating of a material with a higher electrical conductivity than carbon.

The coating may comprise a metal such as copper, silver, aluminium or a suitable alloy.

The coating may be deposited by a number of methods including electrodeposition, electroless deposition, vacuum plating, chemical vapor deposition, organometallic paint, ion plating and cementation.

Preferably the coating comprises copper which is electrodeposited from a low metal, organically brightened acid copper plating solution.

Carbon fibres have a number of advantages over existing chaff materials in that they are fine, e.g. around 7 $\mu m$, light and much stiffer than existing materials.

Typically carbon fibre usually has a Young's modulus of between 100-200 GPa although a modulus of up to 500 GPa is possible whilst that of glass is between 70 to 80 GPa, aluminium is 71 GPa and nylon varies between 2 and 4 GPa.

Stiffness is needed in the dipoles for two reasons. If the dipole bends, its effective length shortens and the bandspread of the radar return is increased with a consequent drop in the return at the tuned frequency. The other problem with bending occurs if the substrate bends more than the coating can take. The coating then cracks, leading to loss of efficiency.

Unfortunately, the electrical conductivity of the carbon in the carbon fibres is about 1000$\times$ lower than that of aluminium and this would lead to a much lower radar response. The electrical conductivity of the dipoles, is therefore improved by coating the outside of the fibre with a more conductive coating, such as copper around 0.5 $\mu m$ thick. Because of the high frequencies used in radar, all the currents induced in the fibres are confined to the outer skin. The length of the dipoles are cut to suit the frequency of the radar they are to be used against and are approximately one half of the wavelength long. Thus at 8.2 GHz they will be 1.7 cm. long whilst at 18.7 GHz they will be 0.8 cm long.

With future radar systems using frequencies of $10^{11}$ Hz the skin depth may be reduced to 0.2 $\mu m$ on a coated carbon fibre with a diameter of 7.5 to 8 $\mu m$.

This thickness of coating will alter the desirable mechanical properties of the carbon fibre dipoles by very little whilst still greatly improving the dipole conductivity.

Many conducting coatings can be used but the best results are to be obtained by the use of metals such as, for example, copper, silver or aluminium, or metallic alloys. There are several ways in which the coating can be deposited, but the systems should be capable of plating a thin, smooth coherent deposit. Such a coating system could be for example electrodeposition, electroless deposition, vacuum plating or chemical vapour deposition. Some other possible systems are systems organometallic paints, ion plating or cementation.

One specific system which produces successful results is electrodeposition of copper, from a low metal, organically brightened, acid copper plating solution. This can give bright smooth deposits of less than 1 $\mu m$ in thickness.

What we claim is:

1. A radar wave dipole for scattering radar radiation, the dipole comprising a carbon fibre having a diameter of around 7 $\mu m$ and a bright smooth surface coating of copper, the coating having a thickness of less than 1 $\mu m$.

2. A radar wave dipole as claimed in claim 1 wherein the coating has a thickness of around 0.5 $\mu m$.

3. A radar wave dipole as claimed in claim 1 wherein the coating has a thickness of around 0.2 $\mu m$.

4. A radar wave dipole as claimed in claim 1 wherein the length of the dipole is substantially half the wavelength of the frequency of the radar radiation to be scattered.

5. A radar wave dipole as claimed in claim 1 wherein the copper coating is an electrodeposition copper coating from an organically brightened acid plating solution.

* * * * *